United States Patent Office 3,018,137
Patented Jan. 23, 1962

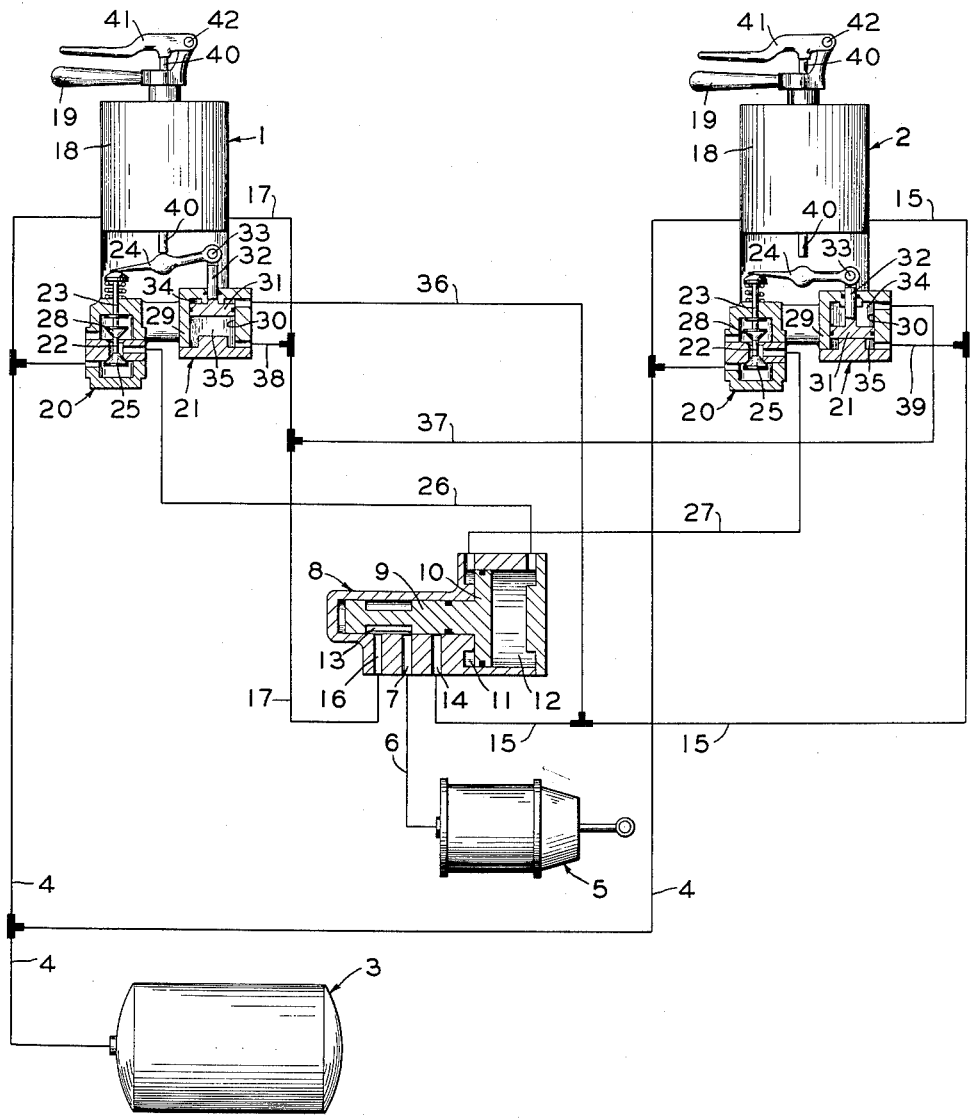

3,018,137
DUAL STATION BRAKE CONTROL SYSTEM
Charles F. B. Shattock and Cyril J. Stone, King's Cross, London, England, assignors to Westinghouse Brake & Signal Company, Ltd., London, England
Filed June 9, 1960, Ser. No. 34,983
Claims priority, application Great Britain Sept. 29, 1959
5 Claims. (Cl. 303—14)

The present invention relates to fluid pressure braking apparatus and is more particularly concerned with providing for control of the brakes from either one of two control stations such that the degree of a brake application initiated from either one of the control stations may be increased or reduced, if desired, from the other station.

Railway locomotives, especially those intended for switching service, often have this form of dual station brake control and the usual way of providing it in the past has been to have at one of the control stations an engineer's brake valve device of the self-lapping type connected mechanically to a dummy handle at the other control station. The mechanical connection is composed of sprockets and chains, rods and bevel gears, or levers and links. Where it is impossible to arrange a straight mechanical connection between the dummy handle and the brake valve device, the number of components in the transmission connection becomes increased to the point at which backlash due to wear very quickly makes the connection unreliable.

The primary object of the present invention is to provide a dual station brake control in which the changeover of control from one station to another station is made by fluid pressure operated means.

According to the present invention, two self-lapping engineer's brake valve devices in or for a fluid pressure braking apparatus can each be connected through a changeover valve in place of the other to control the supply of fluid under pressure to brake cylinders on the locomotive only after the change-over valve is supplied with fluid under pressure by a fluid pressure operated priming arrangement which is responsive to the difference between pressures proportional respectively to the settings of the two brake valve devices. Consequently, whichever one of the handles of the brake valve devices that has been moved the farthest into its respective brake application zone at the time of change-over to effect the greater degree of brake application is connected to the locomotive brake cylinders. The changeover arrangement safeguards against the possibility of an engineer involuntarily releasing a brake application by changing from one control station to the other and endeavoring to bring into operation the brake valve device at the latter station with the handle of the brake valve at this station in a position in the application zone corresponding to a lesser degree of brake application than had been effected by the brake valve device at the former. Either of the brake valve devices may therefore be brought into operation independently of the position of the handle of the other in its respective application zone, although to do this, a movement of the brake valve handle a slightly greater distance into the application zone to increase the degree of the brake application is necessary if an application already exists. This movement need only be momentary should the engineer driver wish to use the brake valve device at the control station at which he is taking over control for the purpose of releasing the brakes.

More particularly, according to the present invention, there is provided in or for fluid pressure braking apparatus the combination comprising two self-lapping engineer's brake valve devices, a change-over valve by which the one or the other of the devices is connected to control the brakes depending upon which of two of its positions it assumes, a pilot valve mechanism associated with each brake valve device for controlling the supply and release of fluid under pressure to and from the change-over valve, and a fluid pressure operated priming means also associated with each brake valve device and arranged to be responsive to the difference between pressures proportional to the position of the handles of the two brake valve devices in their respective brake application zones so as to prime the pilot valve mechanism of the associated device to supply fluid under pressure to the change-over valve if the handle of that brake valve device is in a position at the time to effect a greater degree of brake application than the other brake valve device, each of the pilot valve mechanisms being actuable to a fluid pressure supplying position only when primed in this way for the purpose of causing the change-over valve to connect the associated brake valve device for controlling the brakes. It is to be understood that the invention is applicable both to compressed fluid or vacuum braking apparatus and references herein to "pressure" are to be regarded as implying sub-atmospheric as well as super-atmospheric pressure in so far as the context permits.

To effect the change of control from the one control station to the other, or more particularly to actuate the pilot valve mechanism at each control station, it is preferred to provide on each engineer's brake valve device an element which can be manually manipulated for this purpose by the same hand that the engineer uses to operate the brake valve device. A trigger extending over a rotary brake valve handle so as to be depressible by the thumb is a usual sort of element conforming with this requirement.

The invention will be further described with reference to one embodiment thereof which is taken by way of example only and is illustrated diagrammatically in the accompanying drawing.

In the illustrative embodiment, shown in the single figure of the drawings, the two engineer's brake valve devices are denoted by the numerals 1 and 2. Brake valve devices 1 and 2 are arranged to control a straight-air type of fluid braking apparatus which for the sake of the example will be assumed to be installed on a switching locomotive, both brake valve devices being in the engineer's cab, one to the right of the cab and one to the left. When such a locomotive is shifting railway cars in a hump classification yard, for instance, the engineer may be at one side of the cab in order to see the cuts of cars which branch off in that direction in descending from the hump and will then have to move to the other side in order to see the cuts of cars which branch off in the other direction. At whichever side he is there is a brake valve device at hand. These brake valve devices are of the self-lapping type ensuring in well-known manner that the pressure of compressed fluid supplied thereby from a main reservoir 3 through a pipe 4 to the respective brake valve device and thence to a brake cylinder 5 is dependent upon the extent to which an operating handle of the respective brake valve device has been rotated in a horizontal plane from the release position into a graduated application zone. The end of the zone remote from the release position corresponds to the full service application position and beyond this there is an emergency application position.

Forming part of the braking apparatus is the brake cylinder 5 and compressed fluid is admitted to and released from this cylinder through a pipe 6 opening into a passageway 7 formed in a change-over valve 8. The change-over valve 8 comprises a slide valve member 9 operable between two limit positions by a piston 10 separating two chambers 11 and 12. In one of the limit positions, a cavity 13 in the slide valve member 9 interconnects the passageway 7 with a passageway 14 formed in the change-over valve 8 to which passageway 14 is connected one end of a brake cylinder pipe 15, the opposite end of which is connected to the brake valve device 2. In its other limit position slide valve member 9 interconnects the passageway 7 with a passageway 16 also formed in the change-over valve 8 to which passageway 16 is connected one end of a brake cylinder pipe 17, the opposite end of which is connected to the brake valve device 1.

The brake valve device 1 is identical in construction to the brake valve device 2. As shown illustratively, each brake valve device comprises a self-lapping valve mechanism 18 which is adapted to be manually operated by means of a handle 19 that is operatively connected to the self-lapping valve mechanism through an operating shaft (not shown).

A pilot valve mechanism 20 and also a priming means 21 are associated with each of the brake valve devices 1 and 2.

Each pilot valve mechanism 20 comprises a double-headed valve member 22 carried by a stem 23 and an actuating lever 24, one free end of which contacts the stem 23. Under the action of main reservoir pressure admitted to the underside of a lower head 25 of each valve member 22 from the main reservoir pipe 4, each valve member 22 is biased upwardly to an exhaust position in which pipes 26 and 27 are respectively vented to atmosphere past an unseated upper head 28 of the respective valve members 22. If either lever 24 is depressed sufficiently, the respective valve member 22 assumes a supply position in which the respective lower head 25 is unseated and the upper head 28 seated so as to supply main reservoir pressure to the respective one of the pipes 26 or 27. The pipe 26 extends to the chamber 12 of the change-over valve 8 and the corresponding pipe 27 to the chamber 11.

Each priming means 21 consists of a positioning cylinder 29 having a bore 30. A piston 31 is slidably mounted in the bore 30 and has a piston rod 32 secured thereto. At its free end exterior the cylinder 29, the piston rod 32 carries a pin 33 which constitutes a fulcrum for the lever 24 of the pilot valve mechanism 20. The piston 31 separates upper and lower chambers 34 and 35 within the cylinder 29. The upper chamber 34 in the cylinder 29 of the priming means 21 associated with the brake valve device 1 is connected by a pipe 36 to the brake cylinder pipe 15 which is connected to the brake valve device 2.

The upper chamber 34 in the cylinder 29 of the priming means 21 associated with the brake valve device 2 is connected by a pipe 37 to the brake cylinder pipe 17 which is connected to the brake valve device 1. The lower chamber 35 in the cylinder 29 of the priming means 21 associated with the brake valve device 1 is connected by a pipe 38 to the brake cylinder pipe 17. The lower chamber 35 in the cylinder 29 of the priming means 21 associated with the brake valve device 2 is connected by a pipe 39 to the brake cylinder pipe 15.

As a result, the respective pistons 31 are subject to the difference between pressures proportional to the positions of the operator's control handles 19 of two brake valve devices 1 and 2 and in the event of the position of the handle 19 of the associated brake valve device corresponding to a greater degree of brake application than the position of the handle 19 of the other brake valve device, the predominating pressure beneath the respective piston 31 causes it to rise to the priming position as shown in the case of the brake valve device 1 wherein the priming means 21 associated with the brake valve device 1 is correspondingly connected by virtue of pipes 36 and 38. With the piston 31 in the priming position, the corresponding actuating lever 24 is tilted upwardly so that its mid-portion contacts or comes within reach of a vertical rod 40 movable downwardly by depression of a trigger 41 fulcrumed on a pin 42 carried by the corresponding operator's control handle 19 to cause the valve member 22 of the corresponding pilot valve mechanism 20 to be actuated to the supply position. Each trigger 41 overlies the corresponding operator's control handle 19 for operating the respective brake valve device so that the trigger 41 is depressible by the thumb of the hand grasping the handle.

If both the brake valve devices 1 and 2 are in the release position, both priming means 21 have their pistons lowered and the change-over valve 8 remains in the position to which it was last operated. However, in the drawing, it is assumed that the operator's control handle 19 of the brake valve device 1 has been moved to a position in the braking zone and a partial brake application initiated by that device prevails, the change-over valve 8 having its slide valve member 9 in the limit position interconnecting the passageways 7 and 16 and hence the brake cylinder 5 with the brake cylinder pipe 17.

Assume the engineer now wishes to control the brakes with the other brake valve device 2. To do this, he has to move the handle 19 of brake valve device 2 to a position in the brake application zone corresponding to a greater degree of brake application than that already prevailing. As soon as such a position is reached, the pressure of compressed fluid in the lower chamber 35 of the priming means 21, associated with the brake valve device 2 being that supplied by the device 2, exceeds the pressure in the corresponding upper chamber 34 supplied by the brake valve device 1. Consequently, the piston 31 associated with brake valve device 2 rises to the priming position to condition the brake valve device 2 for the change-over. If, as should be the case, the trigger 41 of brake valve device 2 is held depressed at the same time as moving the corresponding handle 19, movement of the valve member 22 of the corresponding pilot valve mechanism 20 to the supply position will occur simultaneously with the priming and consequently compressed fluid at main reservoir pressure is supplied over the pipe 27 to the chamber 11 of the change-over valve. The other chamber 12 is vented, as will be evident, the brake valve device 1 being now unprimed as well as its trigger being undepressed, and therefore the piston 10 of the change-over valve 8 is moved to the right causing the slide valve member 9 to assume the other limit position interconnecting passages 7 and 14 and hence the brake cylinder 5 with the brake cylinder pipe 15 which is connected to the brake valve device 2. With this connection established, the brake valve device 2 can be used to vary the existing brake application as desired, even though the other device remains set at a partial application. The pistons 31 of the two priming means 21 may move up and down, always in opposite fashion, during subsequent variations of the brake application but this can have no effect without depression of the triggers.

In the event the operator's control handle 19 of one of the brake valve devices having been left in the position corresponding to full service application, it will be necessary for the operator's control handle 19 of the other brake valve device to be moved momentarily to its emergency position in order to bring it into operation. An emergency application of the brakes should take effect with minimum delay and it is therefore preferred that the trigger on each brake valve device is so interlocked with the handle that it is automatically depressed by movement of the handle to the emergency position; such interlocking is a safeguard against the engineer inadvertently failing to depress the trigger in seeking to obtain an emergency application.

Although the illustrated change-over valve 8 is stable in its limit positions with both chambers vented, it may be susceptible to changes of position brought about by switching or other shocks. This valve may therefore be provided with detents or equivalently acting means (not shown) to retain it positively in the limit positions thereby avoiding the necessity of keeping the trigger depressed during control of the brakes.

Having now described the invention, what we claim as new and desire to secure by Letters Patent is:

1. A fluid pressure brake control system for controlling braking of a locomotive from a plurality of control stations, said system comprising a fluid pressure storage reservoir, a fluid pressure actuated device operative to effect a brake application and a brake release on the locomotive, a manually operable control valve device for each of a plurality of separated control stations, each operable to effect the supply of fluid under pressure from said storage reservoir to said fluid pressure actuated device to effect a brake application and the release of fluid under pressure from said fluid pressure actuated device to effect a brake release, a multi-position change-over valve means effective in one position to establish a first fluid pressure communication between the manually operable control valve device located at one of the control stations and said fluid pressure actuated device and effective in another position to close said first fluid pressure communication and to establish a second fluid pressure communication between the manually operable control valve device located at another of the control stations and said fluid pressure actuated device, valve means at each of the control stations operable to control the operation of said multi-position change-over valve means from one of its positions to another of its positions, and fluid pressure responsive means at each of the control stations subject in opposing relation to the pressures of the fluid supplied respectively by said manually operable control valve devices for preventing operation of the said valve means at the corresponding control station unless the pressure supplied by the manually operable control valve device at the corresponding control station exceeds the pressure supplied by the manually operable control valve device at the other control station.

2. A fluid pressure brake control system for controlling braking of a locomotive from a plurality of control stations, said system comprising a fluid pressure storage reservoir, a brake cylinder device operative to effect a brake application and a brake release on the locomotive, a manually operative control valve device for each of a plurality of separated control stations on the locomotive, each operable to effect the supply of fluid under pressure from said storage reservoir to said brake cylinder device to effect a brake application and the release of fluid under pressure from said brake cylinder device to effect a brake release, a multi-position changeover valve means effective in one position to establish a first fluid pressure communication between the manually operable control valve device located at one of the control stations and said brake cylinder device, and effective in another position to close said first fluid pressure communication and to establish a second fluid pressure communication between the manually operable control valve device located at another of the control stations and said brake cylinder device, valve means at each of the control stations operable to control the operation of said multi-position change-over valve means from one of its positions to another of its positions, and fluid pressure responsive means at each of said control stations subject in opposing relation to the pressure of the fluid supplied respectively by said manually operable control valve devices for preventing operation of the said valve means at the corresponding control station unless the pressure supplied by the manually operable control valve device at the corresponding station exceeds the pressure supplied by the manually operable control valve device at the other control station.

3. A dual station fluid pressure braking system for a locomotive, said system comprising a brake cylinder device operative to effect a brake application and a brake release on the locomotive, a first brake valve device located at one of the two control stations on the locomotive, a second brake valve device located at the other of the two control stations, a fluid pressure storage reservoir, a fluid pressure operated two position change-over valve means effective in one position to establish a fluid pressure communication between said first brake valve device and said brake cylinder device and effective in the other of its positions to establish a fluid pressure communication between said second brake valve device and said brake cylinder, a first valve means located at said one of the two control stations operative to effect the supply of fluid under pressure from said reservoir to operate said change-over valve means from its said other to its said one position thereby to render said first brake valve device effective to control the supply and release of fluid under pressure to and from said brake cylinder device, a second valve means located at said other of the two control stations operative to effect the supply of fluid under pressure from said reservoir to operate said change-over valve means from its said one to its said other position thereby to render said second brake valve device effective to control the supply and release of fluid under pressure to and from said brake cylinder device, and a fluid pressure differential responsive means located at each of the two control stations, each responsive means being subject in opposing relation to the pressure of the fluid supplied respectively by said brake valve devices for preventing operation of the corresponding said first or said second valve means unless the fluid pressure supplied by the brake valve device located at the corresponding control station exceeds that supplied by the other of said brake valve devices.

4. A dual station fluid pressure braking system for a locomotive as claimed in claim 3, in which the fluid pressure differential responsive means at each station is characterized by a fulcrumed actuating lever which is shiftable thereby to a position to enable operation of the valve means only when the brake valve device at the corresponding station has been operated to supply fluid at a higher pressure than the brake valve at the other station.

5. A dual station fluid pressure braking system for a locomotive as claimed in claim 3, further characterized in that each of said valve means comprises a supply and release valve member, a manually operative lever associated with the operating handle of the corresponding brake valve, a valve operating rod operative by said manual operating levers, and an actuating lever, one end of which operatively contacts said supply and release valve member, and the other end of which is shifted by the fluid pressure differential responsive means from one position in which said valve operating rod does not contact said actuating lever to a second position in which the actuating lever may be contacted and operated by said actuating rod to effect operation of the supply and release valve member from a position in which said member releases fluid under pressure from the change-over valve means to a position in which it effects the supply of fluid under pressure to said change-over valve means.

References Cited in the file of this patent
UNITED STATES PATENTS

| | | |
|---|---|---|
| 1,103,790 | Macleary | July 14, 1914 |
| 1,486,939 | Winter | Mar. 18, 1924 |
| 2,416,091 | Fitch | Feb. 18, 1947 |